US006952877B2

(12) United States Patent
Pfaltzgraff

(10) Patent No.: US 6,952,877 B2
(45) Date of Patent: Oct. 11, 2005

(54) VEGETATION CUTTING DEVICE

(75) Inventor: James R. Pfaltzgraff, Portland, OR (US)

(73) Assignee: Shindaiwa, Inc., Tualatin, OR (US)

(*) Notice: Subject to any disclaimer, the term of this patent is extended or adjusted under 35 U.S.C. 154(b) by 0 days.

(21) Appl. No.: 10/340,133

(22) Filed: Jan. 10, 2003

(65) Prior Publication Data

US 2004/0134078 A1 Jul. 15, 2004

(51) Int. Cl.[7] .................................................. B26B 7/00
(52) U.S. Cl. ............................ 30/276; 30/347; 56/12.7
(58) Field of Search .......................... 30/276, 347, 285, 30/272.1, 296.1; 56/12.7, 295, 17.5; 138/155; 285/33 D

(56) References Cited

U.S. PATENT DOCUMENTS

| | | | | | |
|---|---|---|---|---|---|
| 4,189,833 | A | | 2/1980 | Kwater | |
| 4,195,408 | A | | 4/1980 | Palmieri et al. | |
| 4,259,782 | A | * | 4/1981 | Proulx | 30/276 |
| 4,476,632 | A | * | 10/1984 | Proulx | 30/276 |
| 4,490,910 | A | * | 1/1985 | Mattson et al. | 30/276 |
| 4,584,771 | A | | 4/1986 | Tillotson | |
| 4,942,664 | A | | 7/1990 | Zatulovsky | |
| 4,959,904 | A | * | 10/1990 | Proulx | 30/276 |
| 5,109,607 | A | * | 5/1992 | Everts | 30/276 |
| 5,526,572 | A | * | 6/1996 | Sugihara et al. | 30/276 |
| 5,659,960 | A | | 8/1997 | Everts et al. | |
| 5,671,536 | A | | 9/1997 | Everts et al. | |
| 5,749,148 | A | * | 5/1998 | White et al. | 30/276 |
| 5,765,287 | A | | 6/1998 | Griffini et al. | |
| 5,806,192 | A | | 9/1998 | Everts et al. | |
| 6,148,523 | A | | 11/2000 | Everts et al. | |
| 6,163,964 | A | * | 12/2000 | Calcinai | 30/347 |
| 6,263,580 | B1 | | 7/2001 | Stark et al. | |
| 2002/0189107 | A1 | * | 12/2002 | Arnetoli | 30/276 |

OTHER PUBLICATIONS

Shindaiwa, Tough Guys Use Tough Machines So Grab A Handful and Hang On 2002 Product Catalog pp 12–13.

* cited by examiner

*Primary Examiner*—Allan N. Shoap
*Assistant Examiner*—Ghassem Alie
(74) *Attorney, Agent, or Firm*—Schwabe, Williamson & Wyatt, P.C.

(57) ABSTRACT

A trimmer head wherein the driveline of the power tool is connected to a core member. A spool is mounted to the core member and directly driven by the core member. A housing is mounted for axially sliding on the core member and a spring urges axial movement of the housing relative to the core member. Interlocking structure on the spool and housing produces interlocking for common rotation of the spool and housing responsive to urging by the spring. Release of the interlocking structure is affected by opposing said spring urging. Desirable additional features include selective alternate positioning of the spring for automatic and manual only release of said interlocking and a line loading assist provided by a tubular post through the spool alignable with housing eyelets for threading line through the eyelets and spool and winding thereof onto the spool by manual turning of the spool relative to the housing.

10 Claims, 5 Drawing Sheets

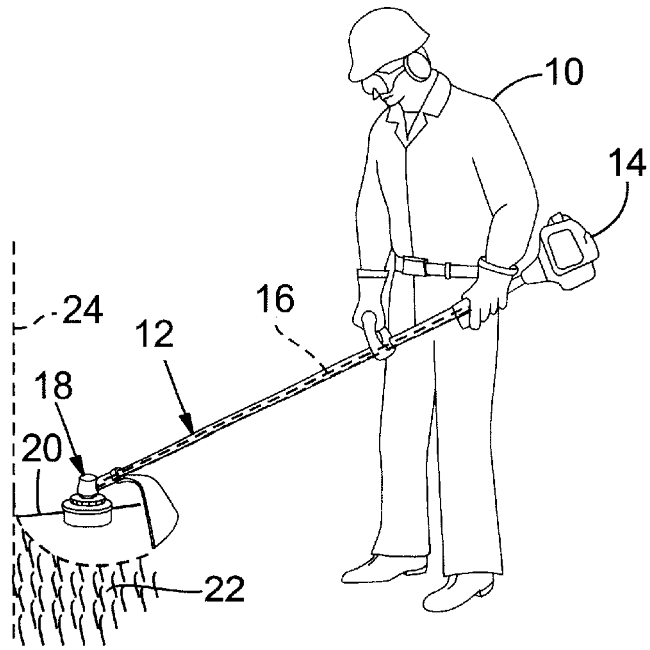
FIG. 1
FIG. 3
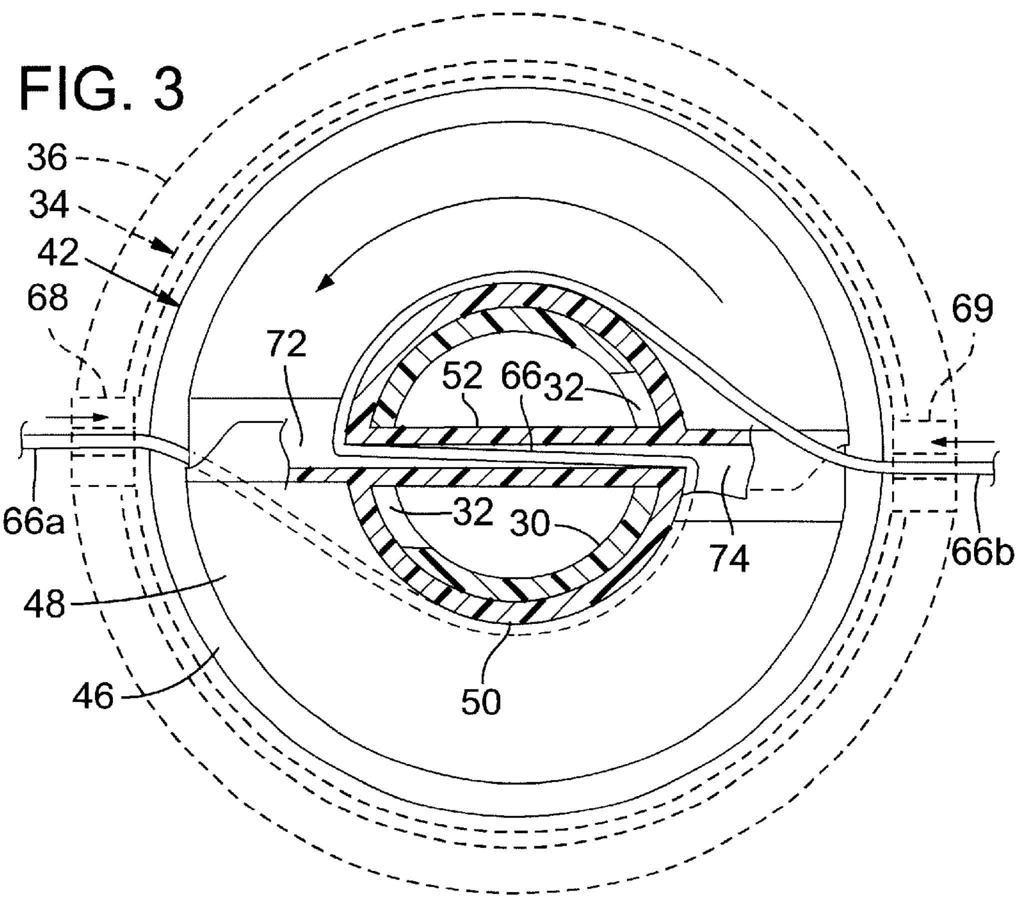

VEGETATION CUTTING DEVICE

FIELD OF THE INVENTION

This invention relates to cutting devices primarily used to cut vegetation and more particularly to devices provided with radially projected flexible line referred to as cord or string used as the implement to cut or mow vegetation such as weeds and grass (hereafter such device being referred to as a "string trimmer").

BACKGROUND OF THE INVENTION

String trimmers have been available and in wide use for many years. It is particularly desirable for trimming along fences, buildings and on grass strips unreachable for the conventional lawnmower. It can also be used to trim borders along sidewalks and driveways and is even desired for cutting small lawns in total. Because the line is flexible, it can impact walls and shrubs with no or minimal damage and is far safer for the user than rigid blades as the cutting implement.

A common type of string trimmer is one where a housing is mounted to a power tool's drive line, a spool of line (string or cord) is contained in the housing and a feed mechanism inside the housing is actuated to feed the line from the housing as needed. As the line or string is used up it is necessary for the operator to disassemble the housing, remove the spool and parts associated therewith, wind a new supply of string on the spool and reassemble the components. It is an objective of the present invention to avoid the need for disassembly of the housing to re-supply the trimmer with cutting string.

Other areas of improvement for the preferred embodiment include the provision of a housing that is less susceptible to penetration from dirt and debris that can cause malfunction or damage, the ability to convert the feed mechanism between automatic and manual feed, and the reduction of vibration. The tool is also adaptable to drive lines regardless of direction of rotation.

BRIEF SUMMARY OF THE INVENTION

One feature of a preferred embodiment of the invention is the provision of a core and not a housing which is connected to the tool's driveline. The housing is driven by the spool. The core extends down through the spool on which the line is wound and directly drives the spool to reduce the vibration as occurs through indirect or floating connection as typical for prior devices. A two part housing encloses the core and spool but the parting line is closer to the top of the housing and provides minimal opportunity for penetration of debris.

A spring acts between the housing spool and has alternate positions to urge the spool to the bottom of the housing or to the top of the housing. Either position provides connection between the spool and housing for driving the housing. However, one position allows bump feed of the line from the housing and the other does not. Manual feed is provided for at least the other position.

The invention and its advantages will be more fully understood with reference to the following detailed description of the preferred embodiment having reference to the accompanying drawings.

BRIEF DESCRIPTION OF THE DRAWINGS

FIG. 1 is a schematic illustration of an operator operating a string trimmer device as contemplated for the present invention;

FIG. 3 is a horizontal section view of a spool for storing and deploying cutting string as utilized in the device of FIG. 2;

DETAILED DESCRIPTION OF THE PREFERRED EMBODIMENT

Figure 2A:
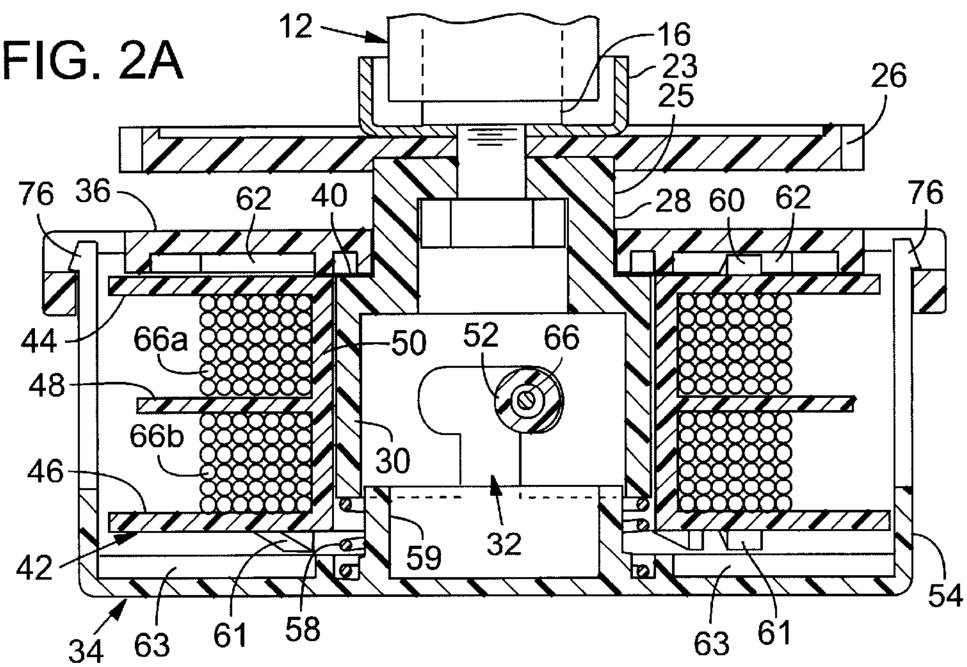
FIGS. 2A and 2B are section views (offset by 90°) of a string trimmer device representing a preferred embodiment of the invention.

Reference is now made to FIG. 1 which schematically represents an operator 10 operating a string trimmer-type cutting device 12. As typical for such devices, a motor 14 drives a driveline 16 extended from the motor to a trimmer head 18. A cutting line, cord or string 20 protrudes from the head 18 and is rotated at a high rpm for cutting grass 22, e.g., as may be located next to a wall 24. The string 20, being flexible, will simply bend upon impacting the wall whereas the grass will be severed.

Figure 2B:
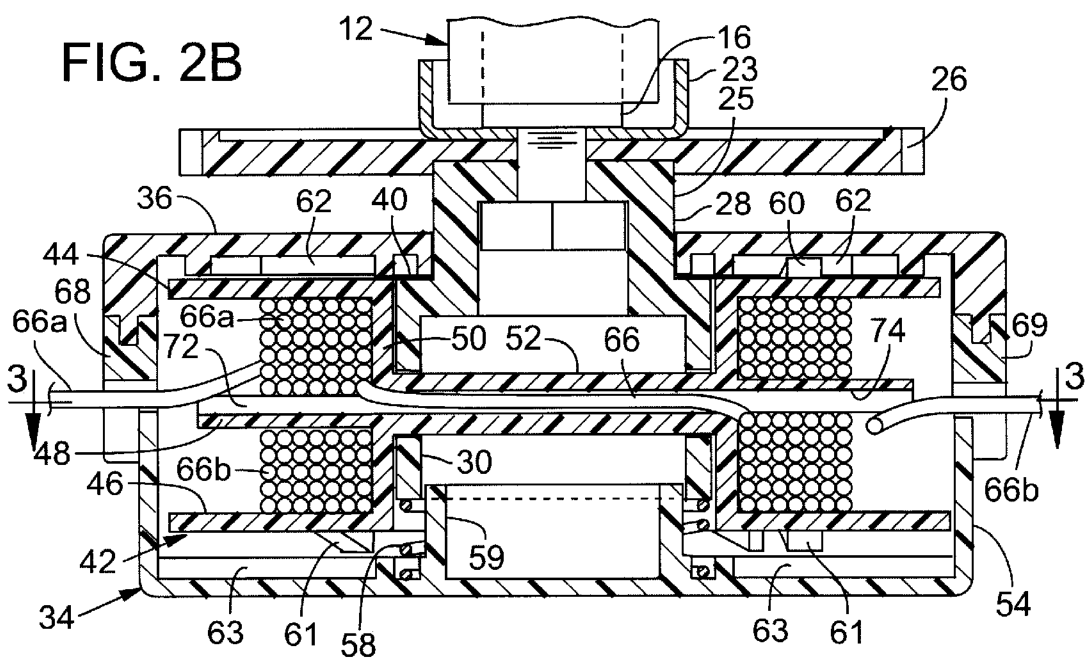

FIGS. 2A and 2B illustrate in cross section a trimmer head of a preferred embodiment of the present invention. The driveline 16 rotatably drives a collar 23. Attached to the collar is a core member 25 which is configured to have a manual turning knob 26, a bearing portion 28 and a securement head 30.

The securement head 30 is cylindrical and has opposing configured slots 32. A housing 34 includes an upper cover 36 mounted to the bearing portion 28 of the core member 25 and is slideable rotatably and axially on said bearing portion as permitted by knob 26 and shoulders 40. A spool 42 (see also FIGS. 3 and 5) is mounted to the securement head 30. The spool includes upper and lower flanges 44, 46 and a center or dividing flange 48, all radiating from a cylinder 50.

The spool 42 has a tubular post 52 spanning the center of the cylinder 50 and as will be explained in a later section, is extended along the dividing flange 48 as indicated in FIG. 2B. The post 52 (in assembled relation) extends through the securement head 30 as permitted by the configured slots 32 and accordingly, as the securement head is rotated by driveline 16, that rotation is transmitted to spool 42 via the post 52. A bottom portion 54 of the housing 34 is releasably locked to the upper cover 36 via lock elements or latches 76.

It will be appreciated from the disclosure at this point that drive line 16 is rigidly connected to the core member 25 and rotatably drives the core member. The core member 25 includes a knob 26, bearing portion 28 and securement head 30. Because spool 42 has its post 52 extended through the securement head 30, the spool 30 is rotatably driven when driveline 16 is rotated. Housing cover 36, as explained, is confined on the bearing portion 28 between the knob 28 and shoulder 40. This confinement enables limited axial sliding of the cover 36 and thus the housing 34 relative to the core member 25. A boss 59 of the bottom portion 54 extends into the securement head 30 to facilitate stabilization of the housing 34. The housing 34 is selectively rotated relative to the core member 30 as will now be explained.

Extended between the bottom portion 54 of housing 34 and the bottom of securement head 30 (of core member 25) is a coil or compression spring 58 seated on boss 59. Spring 58 urges the housing 34 downwardly relative to securement head 30 and thus urges the cover 36 toward and against the shoulder 40 of bearing portion 28. The spool 42 has its upper surface of upper flange 44 positioned relative to shoulder 40 so that the cover 36 is urged into engagement with said upper surface of the spool 42.

Figure 4:
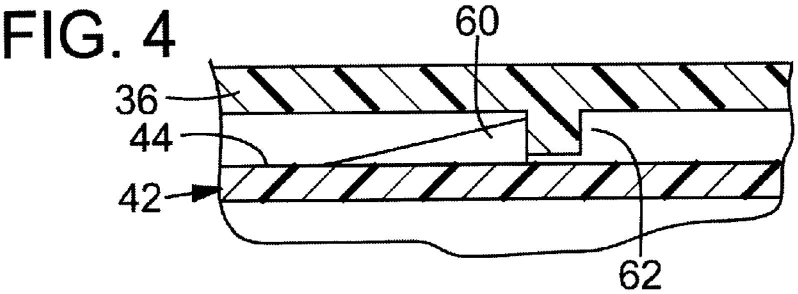
FIG. 4 is a section view illustrating the interlock of the spool with the housing.
Figure 5:
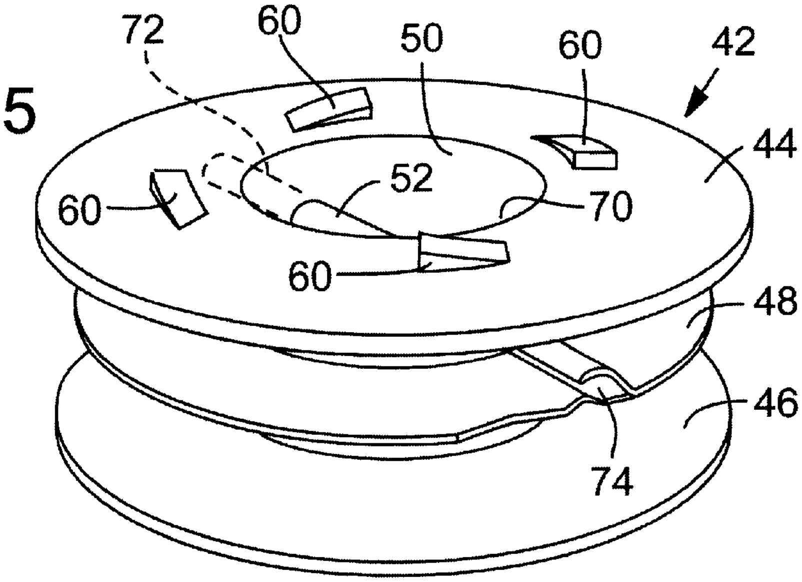
FIG. 5 is a perspective view of the spool of FIG. 3.
Figure 6:
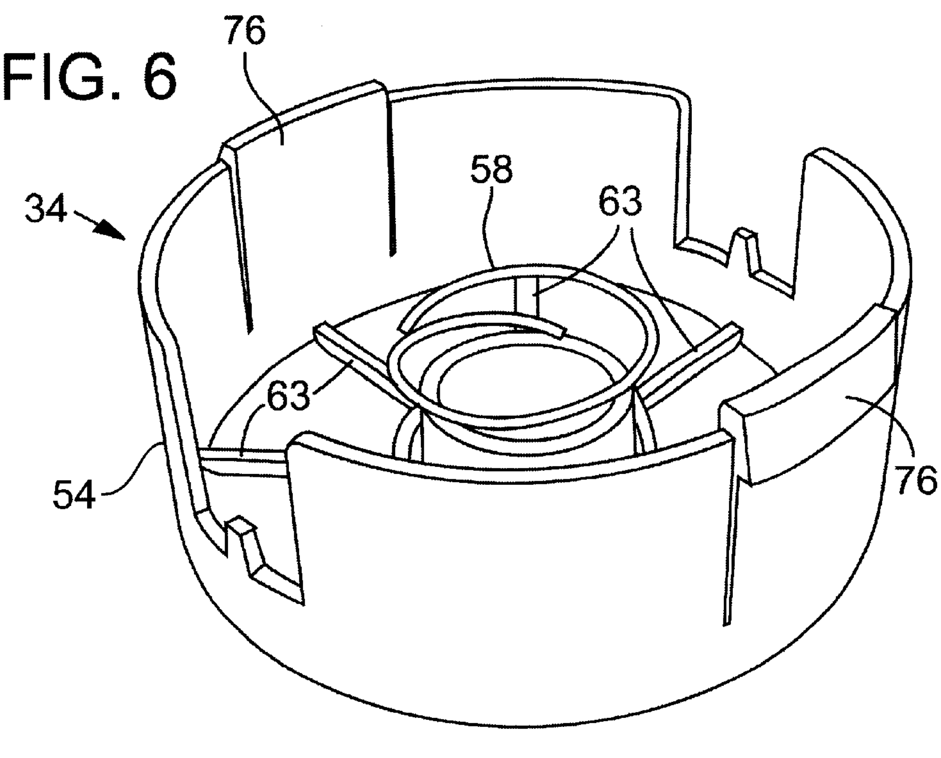
FIG. 6 is a perspective view of a housing portion in which the spool resides.
Figure 7:
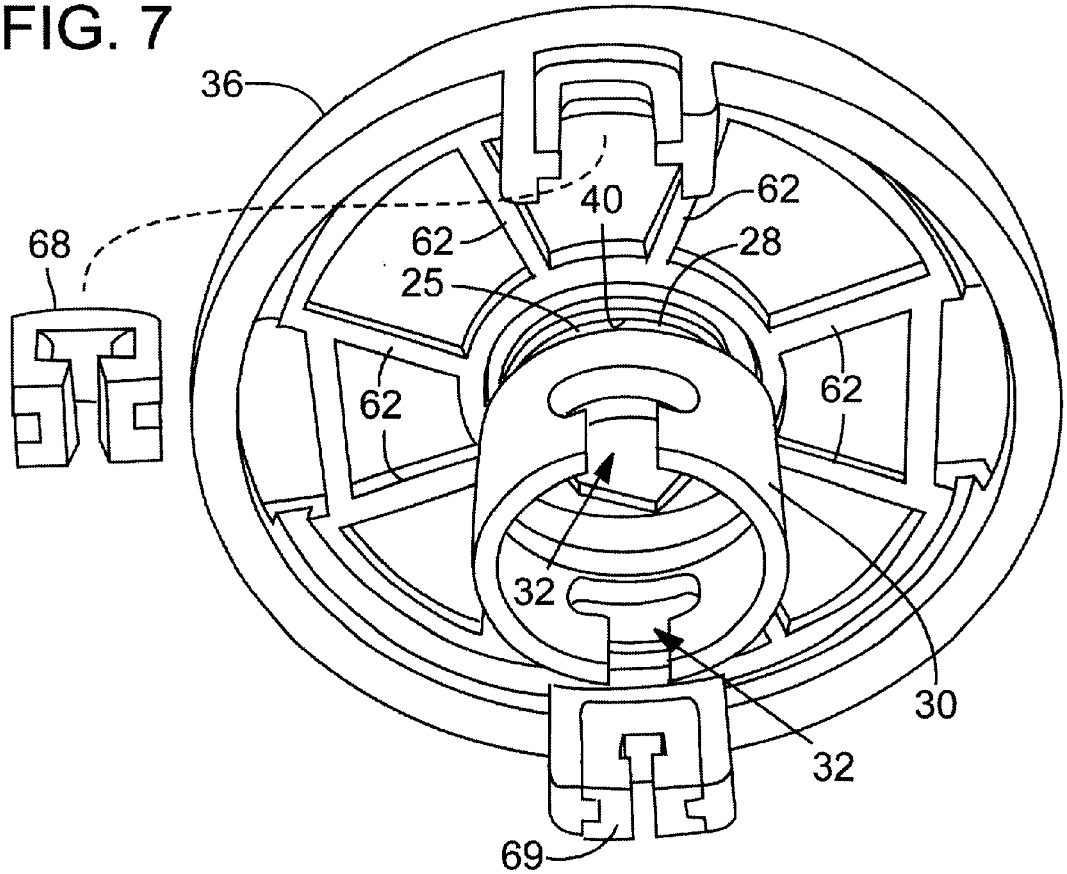
FIG. 7 is a perspective view of the cover and drive mechanism.

Reference is now made to FIG. 5 which is a perspective view of the spool 42. As will be noted, the upper surface of flange 44 is provided with ramp detents 60. Now refer to FIG. 7 and it will be noted that the bottom or inside surface of cover 36 is provided with ribs 62. Thus as the spring 58 urges the housing downward the ribs 62 are urged into engagement with the ramps 60 of the spool (see FIG. 4). The ramps 60 are arranged so that under the influence of the driveline 16, the ribs 62 of cover 36 engage the vertical face 64 of ramp 60 to rotatably drive the cover 36 and thus the housing 34.

Operation

With reference to the figures and particularly FIGS. 2A and 2B, it will be understood that the driveline 16 rotatably drives collar 23 and thus the core member 25 and its various portions and particularly having reference to securement head 30. Because post 52 of spool 42 extends through securement head 30 (FIG. 2B), the spool 42 is also caused to rotate. Because spring 58 forces the cover 36 into engagement with the upper side of flange 44, the ribs 62 of the cover 36 engage the vertical faces 64 of ramp 60 (FIG. 4) and thus generates rotation of the housing 34.

Wound onto the spool 42 is a trimmer line 66 which has an upper winding 66_a_ between the upper flange 44 and divider flange 48. A grommet or eyelet 68 (FIG. 2B) in the wall of the housing 34 allows the line 66_a_ to extend through the housing and extends from the housing for cutting of grass 22 as illustrated in FIG. 1. Lower line 66_b_ is wound onto the spool between the lower flange 46 and the divider flange 48. The end of line 66_b_ extends from the housing through opposing eyelet 69. Thus as explained, the trimmer head is operated to cut grass as long as the desired lengths of line 66_a_ and 66_b_ are extended from the housing 34.

As the line 66_a_ and 66_b_ as projected through the eyelets 68, 69 are worn or broken off, it is necessary to provide for additional lengths to be unwound or fed off of the spool 42. This can be accomplished in either of two ways as shown in FIGS. 2A and 2B. Automatic feeding of the line can be accomplished by simply bumping the bottom of the housing 34 against the ground. Such bumping produces relative axial movement of the housing and core member 25 as permitted by the tolerance between the knob 26 and shoulder 40 and compression of spring 58. The ribs 62 on the cover 36 separate from the ramp detents 60 and the friction producing ground engagement of the housing and centrifugal force of the line projected from the spool produces rotative movement of the housing relative to the spool which in turn produces unwinding of the line segments 66_a_ and 66_b_. As the detents 60 and ribs 62 become disengaged, detents 61 at the bottom of the flange 46 line up with ribs 63 (which are offset from ribs 62) and thus allow limited relative rotation before the detents 61 contact ribs 63. As bumping is but a brief engagement of the housing contacting the ground, the spring 58 effects return axial movement and re-engagement of the ribs 62 and ramp detents 60 following a similar limited relative rotation upon release of ribs 62 from detents 61. Manual unwinding is accomplished only when the tool is shut down. The operator can unwind the string from the spool by pressing the housing upwardly against the knob 26, turning the knob 26, and then pulling on the trimmer lines 66_a_ and 66_b_.

Figure 8:
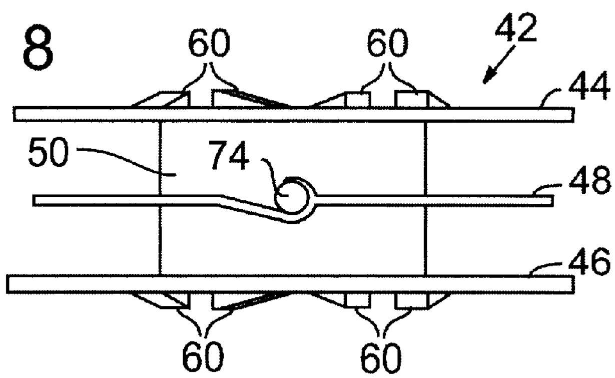
FIGS. 8 and 9 are opposing side views of the spool of FIG. 5.
Figure 9:
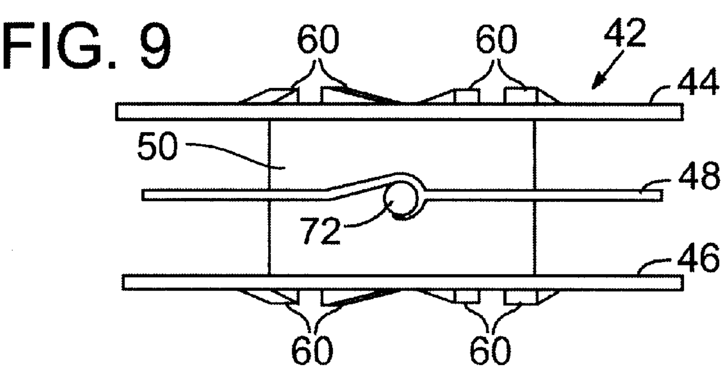

Once the line 66 has been completely used up, it is necessary to obtain a new length of line to assemble onto the spool 42. This is accomplished for the present device (preferred embodiment) with use of the tubular post 52. With reference to FIGS. 3, 8 and 9, it will be noted that the post 52 is fully enclosed as it spans the opening of cylinder 50 of the spool. The tube is provided with an open side 72 at the bottom of the post in one direction (see FIG. 9) and an open side 74 at the top of the post in the opposite direction (see FIG. 8). The operator first aligns the tube 52 with the eyelets 68, 69 to establish a straight through opening for the string. The string is then threaded through the opening until substantially half of the length of the line is at either side of the housing. The operator then simply turns the knob 26 which is opposite the feed out direction and what is permitted by the ramp detents 60 and the string simply winds onto the spool, one side winding onto the upper portion of the spool and the other to the lower portion of the spool as permitted by the open sides 72, 74 of the post 52. (Note that the spool has been rotated a half turn in FIG. 3.)

Figure 10:
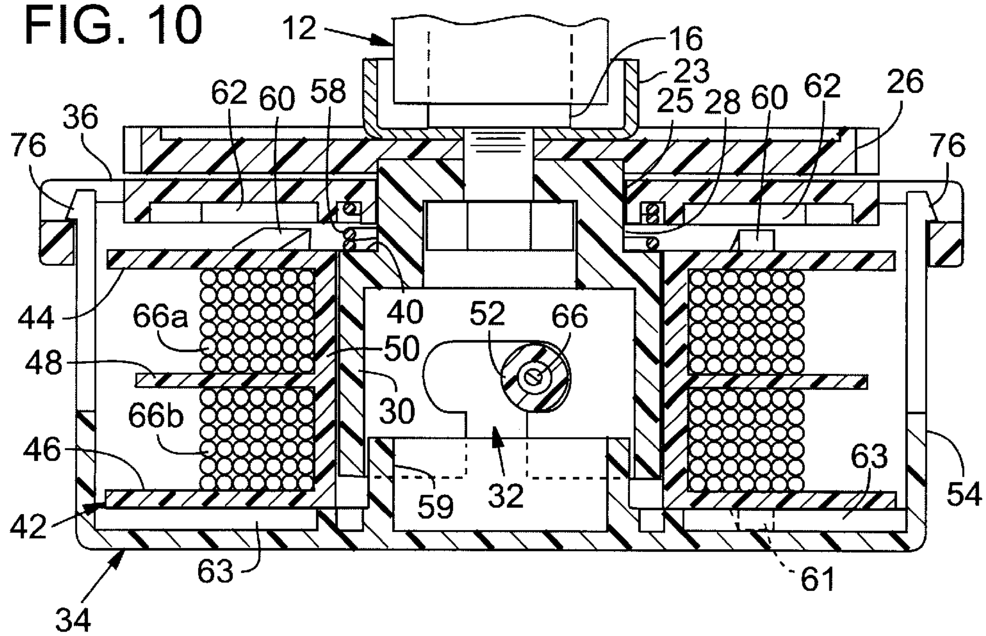
FIG. 10 is a view similar to FIG. 2A but showing an alternate arrangement of parts.

As indicated in the Summary of the Invention, there are occasions where it is preferable that the line is fed out of the eyelets 68, 69 only manually. For the preferred embodiment, a conversion to the non-automatic feeding (non-bump feeding) of the line is accomplished by repositioning the spring 58. The repositioned state is illustrated in FIG. 10. The housing 34 is disassembled by unlatching latches 76 to separate the bottom portion 54 from the cover 36. The core member 25, which is screwed into the collar 23, is unscrewed and thereby separated from the collar 23. The spring 58 is then placed onto the bearing portion 28 and under the cover 36 as shown in FIG. 10 and the core member 25 is screwed back into engagement with collar 23. The spool is then assembled back onto the securement head 30 and the bottom portion 54 reattached (latched) to the cover 36.

With the bottom portion 54 attached to the cover and the cover urged to its uppermost position, the ribs 63 on the lower portion 54 are in close adjacency to the lower flange 46. The ribs 63 engage the vertical faces of the ramp detents 61 to prevent turning of the spool relative to the housing in the same manner as FIG. 2. However, now the housing is in the upper position relative to the core member and bumping no longer will release the engagement between the housing and the spool. Yet with the rotation drive stopped, the housing can be manually urged downwardly against the spring 58 to unwind string from the spool. (The movement is permitted as the engagement by the detents 60, 61 are transferred between the sets of ribs 62 and 63.)

The configured slots 32 are shown as having a T shape which produces nesting of the post 52 in the cross bar of the T to prevent relative axial sliding of spool and core member. This can be accomplished in other ways, e.g., with a straight slot and a locking member, e.g., locking tabs.

It is submitted that there are a number of unique features in the single embodiment disclosed above and these features may be arranged in a variety of configurations and combinations that will be apparent to those skilled in the art. Accordingly, it is intended that the invention is not limited to any specific configuration or arrangement and instead encompasses the full range of devices as defined by the appended claims.

The invention claimed is:

1. A string trimmer head comprising:

a core member driveably connectable to a drive line of a powered cutting tool for rotatable driving of said core member;

a spool connected to said core member and rotatably driven by the core member;

a housing surrounding the spool and adapted for rotation and non rotation relative to the spool, and a control structure controlling the rotation of the housing relative to the spool;

an eyelet through the housing adapted to allow trimmer line to be wound onto the spool and extended from the spool through the eyelet; and said control structure including a first position preventing rotation of the housing relative to the spool for non-feeding of line through the eyelet and a second position tat allows the housing to rotate relative to the spool such that the housing is not being driven by the drive line for feeding line from the spool through the eyelet.

2. A string trimmer head as defined in claim 1 wherein the control structure comprises:

said housing mounted for limited axial movement relative to said spool, axially adjacent surfaces on said housing and spool and interlocking structure formed on said surfaces to effect interlocking and unlocking of the housing and spool upon relative axial movement of said housing and spool.

3. A string trimmer head as defined in claim 2 wherein said control structure further includes a spring that urges said relative axial movement for interlocking said housing and spool.

4. A string trimmer head as defined in claim 3 wherein said spring urges axial movement of the housing downwardly from the drive line whereby bumping of the housing on a ground surface opposes the spring urging and releases the interlocking of the housing and spool for feeding of the string from the spool.

5. A string trimmer head as defined in claim 3 wherein said spring urges axial movement of the housing upwardly toward the drive line and release of the interlocking requires manual downward urging of the housing relative to the spool.

6. A string trimmer head comprising:

a core member and a spool mounted to said core member and a housing surrounding the spool and mounted for relative rotation to the spool, and a control structure controlling the rotation of the housing relative to the spool;

an eyelet through the housing and a trimmer line wound onto the spool and extended from the spool through the eyelet;

said control structure having a first position preventing rotation of the housing relative to the spool for non-feeding of line through the eyelet and a second position enabling limited relative rotation for feeding line from the spool through the eyelet;

said control structure including said housing mounted for limited axial movement relative to said spool, axially adjacent surfaces on said housing and spool and interlocking structure formed on said surfaces to effect interlocking and unlocking of the housing and spool upon relative axial movement of said housing and spool;

said control structure further including a compression spring that urges said relative axial movement for interlocking said housing and spool; and said housing and core member cooperatively configured to provide upper and lower nesting positions for said compression spring, said compression spring in the lower nesting position urging the housing downwardly away from the drive line, and in the upper nesting position urging the housing upwardly toward the drive line; and a dual interlocking structure producing interlocking of the housing and spool with the spring in either nesting position.

7. A string trimmer head as defined in claim 6 wherein the housing and core member are releasably mounted to the drive line and to each other whereby a user can disassemble the housing and core member for reassembly with the spring in either nesting position.

8. A string trimmer head comprising:

a core member and a spool mounted to said core member and a housing surrounding the spool and mounted for relative rotation to the spool, and a control structure controlling the rotation of the housing relative to the spool;

an eyelet through the housing and a trimmer line wound onto the spool and extended from the spool through the eyelet;

said control structure including a first position preventing rotation of the housing relative to the spool for non-feeding of line through the eyelet and a second position enabling limited relative rotation for feeding line from the spool through the eyelet;

the spool provided with a center opening, the core member projected into the center opening and a slot extended through the core member; and a post secured to said spool and spanning the center opening and nested in said slot of the core member for rotative interconnection of the spool to the core member.

9. A string trimmer head as defined in claim 8 wherein the post is provided with tubular opening, said housing having opposed eyelets alignable with said tubular opening whereby a length of string can be threaded through an eyelet, through the tubular opening and through the opposing eyelet and then wound onto said spool by rotation of the spool relative to the housing.

10. A string trimmer head as defined in claim 9 wherein said spool comprises:

an upper flange, a lower flange and a divider flange defining a plane between said upper and lower flanges, and said tubular post extending in opposed directions along the plane of the divider flange, said post in one direction having an upper open side and in the other direction having a lower open side whereby the string is wound from the open sides into upper and lower spool sections defined by said divider flange.

* * * * *